Dec. 11, 1956 H. BRETTHAUER ET AL 2,773,438
PHOTOGRAPHIC CAMERA WITH INTERCONNECTED SHUTTER
MECHANISM AND FILM WINDING MECHANISM
Filed Jan. 30, 1953

INVENTORS
Hermann Bretthauer
BY Gustav Bethmann

Charles Shepard
Attorney

United States Patent Office 2,773,438
Patented Dec. 11, 1956

2,773,438

PHOTOGRAPHIC CAMERA WITH INTERCONNECTED SHUTTER MECHANISM AND FILM WINDING MECHANISM

Hermann Bretthauer and Gustav Bethmann, Braunschweig, Germany, assignors to Franke & Heidecke, Fabrik Photographischer Prazisions-Apparate, Braunschweig, Germany, a firm Application January 30, 1953, Serial No. 334,304

Claims priority, application Germany January 31, 1952

2 Claims. (Cl. 95—31)

This invention relates to photographic cameras and especially to roll-film cameras equipped with a between-the-lens or objective shutter. In many cameras of this kind, as heretofore constructed, there has been considerable danger of double exposure of the film by operating the shutter before moving an unexposed strip of the film into exposure position. There have also been instances in which the film has been advanced before an exposure has been made with a result that a blank space appears on the exposed roll. While interlocking controls between the film winding mechanism and the shutter mechanism are already known, it is an object of the present invention to provide generally improved and more simple, satisfactory, and efficient interlocking controls for locking the film against a feeding movement until the shutter has been operated to expose that part of the film which is in the focal plane.

Another object of the invention is the provision of simple means for locking the shutter against operation a second time, after being operated to expose the film in the focal plane, until an unexposed portion of the film is moved into exposure position, said means being releasable to permit a second exposure if desired.

Still another object of the invention is the provision of simple and inexpensive means for locking the film against feeding movement, said locking means being released automatically when the shutter is operated and simultaneously operative to lock the shutter against a second operation until a new strip of film has been moved into the focal plane of the camera, means being provided for disconnecting the shutter from the film operating devices while the camera may be temporarily converted into a plate camera by means of a conventional plate adapter.

A further object of the invention is the provision of means for locking the film against feeding movement while an unexposed field of the film is in exposure position, said means being released when the camera is opened to insert an unexposed film.

Figure 1:
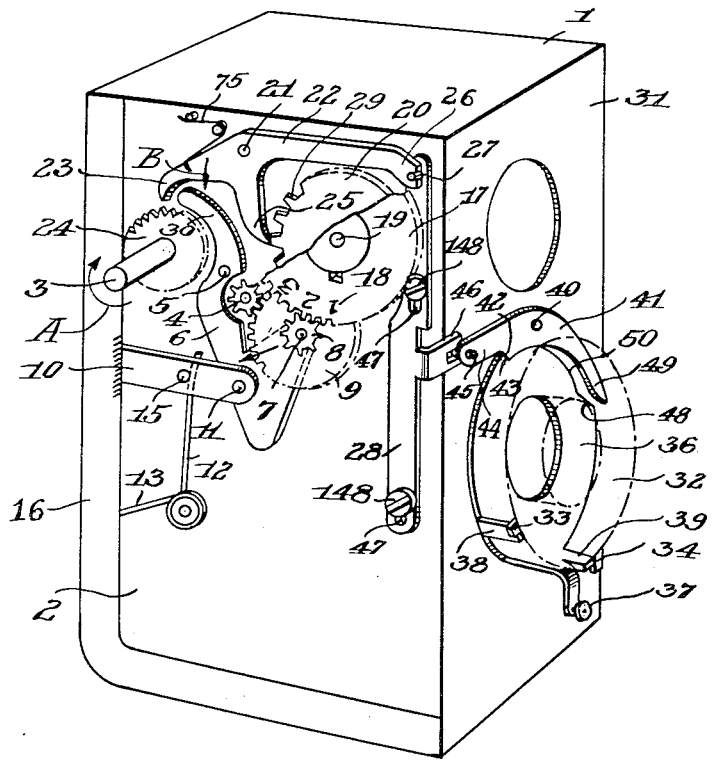
Figure 2:
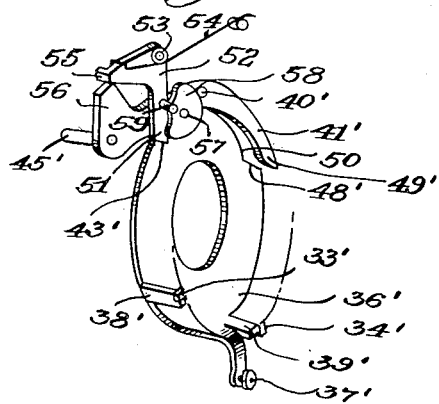

These and other desirable objects may be attained in the manner disclosed as an illustrative embodiment of the invention in the following description and in the accompanying drawings forming a part hereof, in which:

Fig. 1 is a perspective view of a camera illustrating one possible application of the invention, the outer casing or cover wall being removed to expose the underlying parts, and the index wheel being broken away to expose underlying parts, and Fig. 2 is a perspective view of the shutter devices illustrating another possible embodiment of the invention.

The same reference numerals refer to the same parts in both figures of the drawings.

The camera illustrated comprises a case indicated in general at 1. A shaft 3 is revolubly mounted in the side wall 2 of the camera. At its inner end the shaft operatively engages a film spool, not shown, on which the exposed film is adapted to be wound. The shaft 3 projects from the side of the camera and may be provided with a knob on its outer end for turning the same in the direction of the arrow A to wind the film thereon. These parts are or may be of any well known or preferred construction. When the shaft 3 is turned to wind the film, a measuring roller, not shown, is turned by the travel of the film, and this measuring roller is operatively connected to the toothed wheel 4 to turn it.

Pivotally mounted on the side wall of the camera at 5 is a lever 6. At its forward end the lever 6 carries a pin or arbor 7 on which gears 8 and 9 are mounted. The gears 8 and 9 are fixed to each other so that they turn in unison. The gear wheel 9 meshes with the wheel 4 and is turned thereby when the film is wound on its spool, and turns the wheel 8 with it.

Slidably mounted on the side wall of the camera is a slide 10 pivotally connected with the lever 6 at 11. A spring 12 has its end 13 anchored on the camera case and its other end engages a projection 15 on the slide and urges it rearwardly against the back 16 of the camera, and turns the lever 6 in a clockwise direction when the back of the camera is opened or removed to insert a new film. When the camera back is closed, it presses against the end of the slide 10 and moves this slide to the right, swinging the lever 6 in a counterclockwise direction. When the parts are in the position shown in the drawings, the gear wheel 8 engages with teeth on an index wheel 17, having indices 18 which are visible through an opening in the camera case, in a well known manner, to indicate which part of the film is in exposure position. When the shaft 3 is turned to wind the exposed film, the motion of the film turns the gear 4 to turn the wheel 17 through an arc equivalent to the distance between two successive exposure indices 18.

The index wheel 17 is mounted on a spindle 19, and mounted on the same spindle adjacent thereto is a toothed wheel 20. The wheel 20 has a limited rotary movement through a small angle relative to the wheel 17. The wheels 17 and 20 are resiliently connected to each other by means of a spring, not shown, which is tensioned when the wheel 20 is anchored and the wheel 17 turned relative to the wheel 20. When however the wheel 20 is released, the spring operates to turn it.

A lever 22 is pivotally mounted on the side wall of the camera at 21, and at its rear end has a pawl 23 adapted to engage teeth on a ratchet wheel 24, which is fixed on the shaft 3. The lever 22 has a depending arm 25 adapted to cooperate with the wheel or disk 20, and also a forwardly extending arm 26 terminating in a bifurcated end which engages a pin 27 fixed in the upper end of a slide 28 mounted on the side wall and having a limited vertical movement thereon. A spring 75 is connected with the lever 22 and urges it resiliently in the counterclockwise direction of the arrow B in the drawing to tend to engage its pawl with the ratchet wheel 24. With the parts in the position shown in the drawing, the movement of the lever 22 under the action of its spring 75 is limited by its engagement with the periphery of the wheel 20. With the parts in this position, if the shaft 3 is turned to wind the film, the index wheel 17 is turned through the gears 4, 9, and 8, and moves the toothed wheel 20 with it until the arm 25 of the lever 22 engages in the space between two of its teeth. The pawl 23 then engages the ratchet wheel 24 and prevents further turning of the shaft 3. It will be noted that the teeth on the wheel 20 are spaced according to the spacing of the exposure indices 18, so that the above movement takes place when a new strip of the film has been moved into exposure position. Further winding of the film is prevented until the ratchet wheel 24 is released by its pawl by devices presently to be described.

If the lever 22 is turned in a clockwise direction, its pawl 23 disengages the ratchet 24 to release the film winding shaft and simultaneously the arm 25 releases the toothed wheel 20, which is then advanced through a slight angle by its spring to position a tooth under the arm 25, which then holds the lever 22 in the position shown in the drawings against the tension of its spring 75.

When the rear wall 16 of the camera is opened the slide 10 moves rearwardly under the action of its spring 12 and swings the lever 6 in a clockwise direction, and carries the gear wheel 8 out of engagement with the index wheel, which under the action of the usual spring is turned back to its starting point and a sufficient distance beyond the first exposure index number to permit the film leader to be wound beyond the exposure area of the camera before the first index number comes into view. By the same movement, the end 30 of the lever 6 engages the lever 22 and swings it against the action of its spring 75 in a clockwise direction to release the ratchet 24 and the film winding shaft 3, while the back of the camera is open. By this arrangement the leader of the new film may be wound on the spool independently of the index wheel 17. When the back 16 is replaced on the camera the slide 10 returns the lever 6 to the position shown in the drawing. When the last area of the film has been exposed, the teeth of the wheel 20 have passed from under the arm 25 which then rests on a smooth periphery portion of the wheel, and to avoid turning the index wheel 17 further its peripheral indentation is recessed (that is, the gear teeth are cut away) at the point with which the gear wheel 8 would come into engagement therewith after the last exposure of the film.

A between-the-lens shutter or objective shutter indicated diagrammatically at 32 is mounted, in a well known manner, in the front wall of the camera. The shutter has the usual setting lever 33 and the release lever 34. A ring 36 is mounted on the shutter concentrically therewith, and is rotatable by the finger piece 37 to set the shutter by means of the lug 38 when turned in one direction, or to release the shutter by means of the lug 39 when turned in a reverse direction. A lever 41 is pivotally mounted on the pivot 40 on the front wall of the camera, and has a toothed projection or pawl 42 on one side adapted to engage a stop or projection 43 on the ring 36, to prevent turning of the ring in a clockwise direction to set the shutter. The end 44 of the lever carries a pin or projection 45 adapted to engage in a slot provided therefor in an arm 46 projecting from the slide 28. The slide 28 has a limited vertical movement on guiding screws 148 in the side wall of the camera.

In the position of the parts shown in Fig. 1 of the drawings the film winding mechanism is free to be operated until a strip of unexposed film is moved into exposure position, whereupon the arm 25 of the lever 22 drops between two of the teeth 29 and permits the pawl 23 to engage the ratchet 24. This movement of lever 22 raises the arm 26 and with it the slide 28, which in turn swings the shoulder 42 of the lever 41 out of engagement with the shutter operating ring 36 so that the shutter can be set or tensioned for an exposure by manipulating the finger piece 37 in a clockwise direction. It will be noted that at this time the film winding devices are inoperative. The shutter can be released for an exposure only after being set or tensioned. To release the shutter for an exposure, the ring 36 is turned in a counterclockwise direction and the lug 39 actuates the shutter release lever 34. This movement of the ring permits the lever 41 to reengage the stop on the ring and prevents a second operation thereof until released by winding the exposed section of the film, as previously described, since the parts again occupy the positions shown in the drawings. The ring 36 has a cam shoulder 48 adapted to engage the free end 49 of the lever 41 when the ring is turned to shutter releasing position, and move the shoulder 42 of the lever 41 into the space between the shoulder 48 and the stop 43, at the same time moving the slide 28 down and turning the lever 22 clockwise to release the ratchet 24 for further film winding. The operation may be repeated until the entire film is exposed and it becomes necessary to replace it with an unexposed film, as previously described, during which time the shutter is locked against a setting or tensioning movement until the new film has been moved in exposure position and the arm 25 is operated to lock the film winding devices and the parts are operated to withdraw the projection 42 from engagement with the shutter ring.

A modified form of the shutter operating devices is shown in Fig. 2 of the drawings. In this form of the invention, means are provided for releasing the shutter operating devices from the film winding devices at will, so that a double exposure may be made on the same film area, or so that the camera may be used with a plate adapter, or with a miniature film adapter requiring the disconnection of the regular film feed mechanism.

In this form of the parts, except as noted below, are identical with the corresponding parts in the previous form, and are indicated by the same reference numerals, with the addition of a prime to each numeral. The shutter operating ring 36' is adapted to be operated by the finger piece 37', as before. The lever 41' is pivoted at 40' to the front wall of the camera. Instead of directly engaging the stop shoulder 43' on the operating ring 36', a lever 52 is pivoted on a pin 53 which may be carried on the lever 41', and has a lug or projection 51 adapted to engage the stop 43' to prevent operation of the operating ring 36' to set the shutter. A spring 54 having one end anchored on the front wall of the camera tends to turn the lever 52 counterclockwise to cause an ear 55 thereon to rest on a projection 56 on the lever 41', in which position the lug 51 of the lever 52 is in position to engage with the stop 43' on the ring 36'.

A cam disk 58 is revolubly mounted on the pivot 57 which may be supported on the lever 41', and engages a pin or projection 59 on the lever 52. The disk 58 is accessible at the front of the camera and may be turned manually to swing the lever 52 clockwise to a position in which the part 51 is out of the range of travel of the stop or shoulder 43'. The operating ring is now free to be actuated to set the shutter, and since the cam 58 maintains the lever 52 disengaged from the ring 36' the camera may be operated in the conventional manner until the cam 58 is turned to permit the lug 59 to again engage the stop on the operating ring.

The parts 6, 10, 22, 24, etc., on the side of the camera may be exposed on the outside of the casing, or preferably may be enclosed or covered by an outer wall or part of the casing (having, of course, a sight opening or window through which the exposure numbers 18 may be read).

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims. For example, the pivots 53 and 57 may be on the front wall of the camera body, instead of on the lever 41'.

What is claimed is:

1. A photographic camera having a shutter and comprising an oscillatable member shiftable in a first direction to tension the shutter ready for operation and shiftable in a reverse direction to trip the tensioned shutter to make an exposure, film winding and metering means including a ratchet and a shiftable pawl movable from a disengaged position to a position engaging said ratchet to stop further winding of film after a predetermined length of film has been fed, spring means tending to move said pawl to its engaged position, blocking means engaging said oscillatable member and shiftable from a first position blocking said oscillatable member against movement in its said first direction to a second position in non-blocking relation to said oscillatable member, a shiftable link operatively connecting said pawl and said blocking means to each other to move said blocking means from its first position to its second position when said pawl moves from its disengaged position to its engaged position and to move said pawl from its engaged position to its disengaged position against the force of said spring means when said blocking means is moved from its second position to its first position, and a cam on said oscillatable member for engaging said blocking means to move said blocking means from its second position to its first position when said oscillatable member is shifted in its said reverse direction.

2. A photographic camera having a shutter and comprising an oscillatable member shiftable in a first direction to tension the shutter ready for operation and shiftable in a reverse direction to trip the tensioned shutter to make an exposure, film winding and metering means including a ratchet and a shiftable pawl movable from a disengaged position to a position engaging said rachet to stop further winding of film after a predetermined length of film has been fed, spring means tending to move said pawl to its engaged position, blocking means engaging said oscillatable member and shiftable from a first position blocking said oscillatable member against movement in its said first direction to a second position in non-blocking relation to said oscillatable member, a shiftable link operatively connecting said pawl and said blocking means to each other to move said blocking means from its first position to its second position when said pawl moves from its disengaged position to its engaged position and to move said pawl from its engaged position to its disengaged position against the force of said spring means when said blocking means is moved from its second position to its first position, a cam on said oscillatable member for engaging said blocking means to move said blocking means from its second position to its first position when said oscillatable member is shifted in its said reverse direction, and means for rendering said blocking means inoperative so that said oscillatable member may be shifted regardless of the position of said pawl.

References Cited in the file of this patent

UNITED STATES PATENTS

| | | |
|---|---|---|
| 2,168,974 | Christie | Aug. 8, 1939 |
| 2,308,934 | Ranft et al. | Jan. 19, 1943 |
| 2,406,366 | Graef | Aug. 27, 1946 |
| 2,539,764 | Wisegarver | Jan. 30, 1951 |
| 2,541,289 | Richartz | Feb. 13, 1951 |
| 2,548,549 | Mihalyi | Apr. 10, 1951 |
| 2,663,234 | Hodges | Dec. 22, 1953 |